US008015245B2

(12) United States Patent
Milic-Frayling et al.

(10) Patent No.: US 8,015,245 B2
(45) Date of Patent: Sep. 6, 2011

(54) PERSONALIZED INFORMATION COMMUNICATIONS

(75) Inventors: Natasa Milic-Frayling, Cambridge (GB); Jamie Costello, St. Albans (GB); Anthony Francis Frayling, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 11/409,942

(22) Filed: Apr. 24, 2006

(65) Prior Publication Data

US 2007/0250591 A1    Oct. 25, 2007

(51) Int. Cl.
*G06F 15/16* (2006.01)
*G06F 3/048* (2006.01)
*H04W 24/00* (2009.01)
*G06T 13/00* (2011.01)

(52) U.S. Cl. ........ 709/204; 709/205; 709/206; 715/706; 715/745; 715/746; 455/456.1; 455/456.3; 345/473; 345/629

(58) Field of Classification Search .................. 709/203, 709/218, 313; 715/706, 745, 746; 345/473; 455/456.1, 456.3
See application file for complete search history.

(56) References Cited

U.S. PATENT DOCUMENTS

| | | | | |
|---|---|---|---|---|
| 5,546,518 A | * | 8/1996 | Blossom et al. | 345/473 |
| 5,646,866 A | * | 7/1997 | Coelho et al. | 715/716 |
| 5,687,331 A | * | 11/1997 | Volk et al. | 715/840 |
| 5,948,040 A | | 9/1999 | DeLorme et al. | |
| 5,949,432 A | * | 9/1999 | Gough et al. | 345/629 |
| 6,072,489 A | * | 6/2000 | Gough et al. | 715/803 |
| 6,262,746 B1 | * | 7/2001 | Collins | 345/629 |
| 6,331,861 B1 | * | 12/2001 | Gever et al. | 345/629 |
| 6,353,450 B1 | * | 3/2002 | DeLeeuw | 715/768 |
| 6,668,078 B1 | * | 12/2003 | Bolle et al. | 382/164 |
| 6,711,474 B1 | | 3/2004 | Treyz et al. | |
| 6,731,825 B1 | * | 5/2004 | Acampora et al. | 382/284 |
| 6,769,094 B2 | * | 7/2004 | Loesch et al. | 715/203 |
| 6,816,893 B2 | * | 11/2004 | Boaz et al. | 709/218 |
| 6,856,323 B2 | * | 2/2005 | Moore | 345/629 |
| 6,906,643 B2 | | 6/2005 | Samadani et al. | |
| 6,917,968 B2 | | 7/2005 | Nakamura | |
| 7,103,642 B1 | * | 9/2006 | Chen et al. | 709/218 |
| 7,133,900 B1 | * | 11/2006 | Szeto | 709/206 |
| 7,256,711 B2 | | 8/2007 | Sheha et al. | |
| 7,342,587 B2 | * | 3/2008 | Danzig et al. | 345/473 |
| 7,343,165 B2 | * | 3/2008 | Obradovich | 455/456.1 |
| 7,450,003 B2 | | 11/2008 | Weber et al. | |

(Continued)

OTHER PUBLICATIONS

Office Action from the United States Patent Office regarding U.S. Appl. No. 11/414,967 dated Aug. 21, 2009.

(Continued)

*Primary Examiner* — Joseph Thomas
*Assistant Examiner* — Tae K Kim

(57) ABSTRACT

A personalized information communications system enables a source user to provide personalized information in a datastore for access and display by a communications device of a recipient user. An aggregation server records user settings of the source user in a datastore, and collects personalized information of the source user into the datastore based on the user settings. The user settings specify at least one element of personalized information specified by the source user. In response to request from the recipient user, the aggregation server accesses and provides the personalized information of the source user to the recipient user. In one implementation, the communications device periodically polls the aggregation server for updated information associated with the source user. Alternatively, the aggregation server pushes the information to the communications device. Accordingly, the recipient user gains access to the personalized information of the source user.

20 Claims, 13 Drawing Sheets

U.S. PATENT DOCUMENTS

| | | | |
|---|---|---|---|
| 7,466,810 B1 * | 12/2008 | Quon et al. | 379/201.01 |
| 7,492,371 B2 * | 2/2009 | Jeffrey et al. | 345/559 |
| 2002/0032637 A1 * | 3/2002 | Moshal et al. | 705/37 |
| 2002/0045456 A1 * | 4/2002 | Obradovich | 455/457 |
| 2002/0052976 A1 * | 5/2002 | Loesch et al. | 709/313 |
| 2002/0059201 A1 * | 5/2002 | Work | 707/3 |
| 2002/0145615 A1 * | 10/2002 | Moore | 345/629 |
| 2003/0056220 A1 * | 3/2003 | Thornton et al. | 725/62 |
| 2003/0067469 A1 * | 4/2003 | Soroushi | 345/519 |
| 2003/0073446 A1 | 4/2003 | Tsuchiya | |
| 2004/0179039 A1 | 9/2004 | Blattner et al. | |
| 2004/0203718 A1 | 10/2004 | Knauerhase et al. | |
| 2004/0225959 A1 * | 11/2004 | D'Orto et al. | 715/513 |
| 2004/0260710 A1 * | 12/2004 | Marston et al. | 707/100 |
| 2005/0023763 A1 * | 2/2005 | Richardson | 273/348 |
| 2005/0075116 A1 * | 4/2005 | Laird et al. | 455/456.3 |
| 2005/0137015 A1 * | 6/2005 | Rogers et al. | 463/42 |
| 2005/0172001 A1 * | 8/2005 | Zaner et al. | 709/205 |
| 2006/0089160 A1 | 4/2006 | Othmer | |
| 2006/0101115 A1 * | 5/2006 | Gleckman | 709/203 |
| 2006/0170945 A1 * | 8/2006 | Bill | 358/1.13 |
| 2006/0181546 A1 | 8/2006 | Jung et al. | |
| 2006/0240851 A1 * | 10/2006 | Washburn | 455/466 |
| 2006/0291629 A1 | 12/2006 | Esh et al. | |
| 2007/0002057 A1 * | 1/2007 | Danzig et al. | 345/473 |
| 2007/0113181 A1 * | 5/2007 | Blattner et al. | 715/706 |
| 2007/0150188 A1 | 6/2007 | Rosenberg | |
| 2008/0045138 A1 | 2/2008 | Milic-Frayling | |
| 2008/0045236 A1 | 2/2008 | Nahon et al. | |
| 2008/0119177 A1 | 5/2008 | Hovnanian et al. | |
| 2008/0227473 A1 | 9/2008 | Haney | |

OTHER PUBLICATIONS

Office Action from the United States Patent Office regarding U.S. Appl. No. 11/414,967 dated Dec. 14, 2009.

Office Action from the United States Patent Office regarding U.S. Appl. No. 11/414,967 dated Jul. 27, 2010.

Office Action from the United States Patent Office regarding U.S. Appl. No. 11/414,967 dated Nov. 9, 2010.

Office Action from the United States Patent Office regarding U.S. Appl. No. 11/414,967 dated Apr. 14, 2011.

* cited by examiner

PERSONALIZED INFORMATION COMMUNICATIONS

BACKGROUND

Existing mobile communications are typically performed via voice or data messaging, such as mobile phone communications, text messaging, emailing, and media messaging (e.g., videoconferencing). These communication types provide acceptable means for direct, active communications between two parties during one or more focused communications events using a single communications source, channel, media, etc. For example, to accomplish such communication, the sending party generates a message (e.g., speaking into the phone, typing an email, etc.) and transmits the message to a receiving party. The receiving party then focuses his or her attention on the received message (e.g., listening to the sender's voice, reading the email message, etc.), and potentially responds. Each communications event results in a message that demands attention of the recipient (e.g., to respond to the message, to delete the message, etc.). In many cases, the message content is not automatically exposed to the user but instead is hidden within an application and the file system of the mobile device. As such, access to such message content typically requires user interface actions to access the message content (e.g., answering the mobile phone, opening an email or a text message, etc.).

However, these individual communication mechanisms do not provide for richer, more passive, sustained communications. For example, if two individuals are geographically separated and wish to share thoughts about each other, express emotions, or simply share a remote experience, there are no adequate means of communications for facilitating a rich sustained interaction, particularly when the communication involves multiple concurrent communication sources, devices, and/or media.

Furthermore, the communications content, initiated on a mobile phone, a desktop computer, or some other computing device, may need to be accessible on different devices to enable effective communication. However, existing technologies fail to provide the ability to create relevant personalized content from different platforms and view it on various display surfaces that are connected with the communication service.

SUMMARY

Implementations described and claimed herein address the foregoing problems by providing a personalized information communications system that enables a source user to provide personalized information in a datastore for access and display by a communications device of a recipient user. An aggregation server records user settings of the source user in a datastore, and collects personalized information of the source user into the datastore based on the user settings. The user settings specify at least one element of personalized information specified by the source user. In one implementation, user settings may be expressed in combination with a display definition or template that defines types of personalized data that are collected by or on behalf of a source user and further defines the display layout for that content, in general or for a particular recipient user. In response to a request from the recipient user, the aggregation server accesses and provides the personalized information of the source user to an identified recipient user. In one implementation, the communications device periodically polls the aggregation server for updated information associated with the source user. Accordingly, the recipient user gains access to the personalized information of the source user, wherein such information is displayed in a continuous or semi-continuous manner on the device of the recipient user. In another implementation, the aggregation server pushes the personalized information to the device of the recipient user after a connection between the recipient user and the personalized data of the source user is established, also providing continuous or semi-continuous display of the information.

In some implementations, the recipient user can have access to a multiple source users at a given time, connecting with multiple aggregation servers and/or using multiple source user templates on the single or multiple display surfaces. The recipient user can also be given options to control how the source user content integrations with the display layout. In one implementation, the display on the recipient desktop can be decorated by picture frames, "skins", or other display format parameters that the recipient user can select for the content of a particular source user at a given time.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
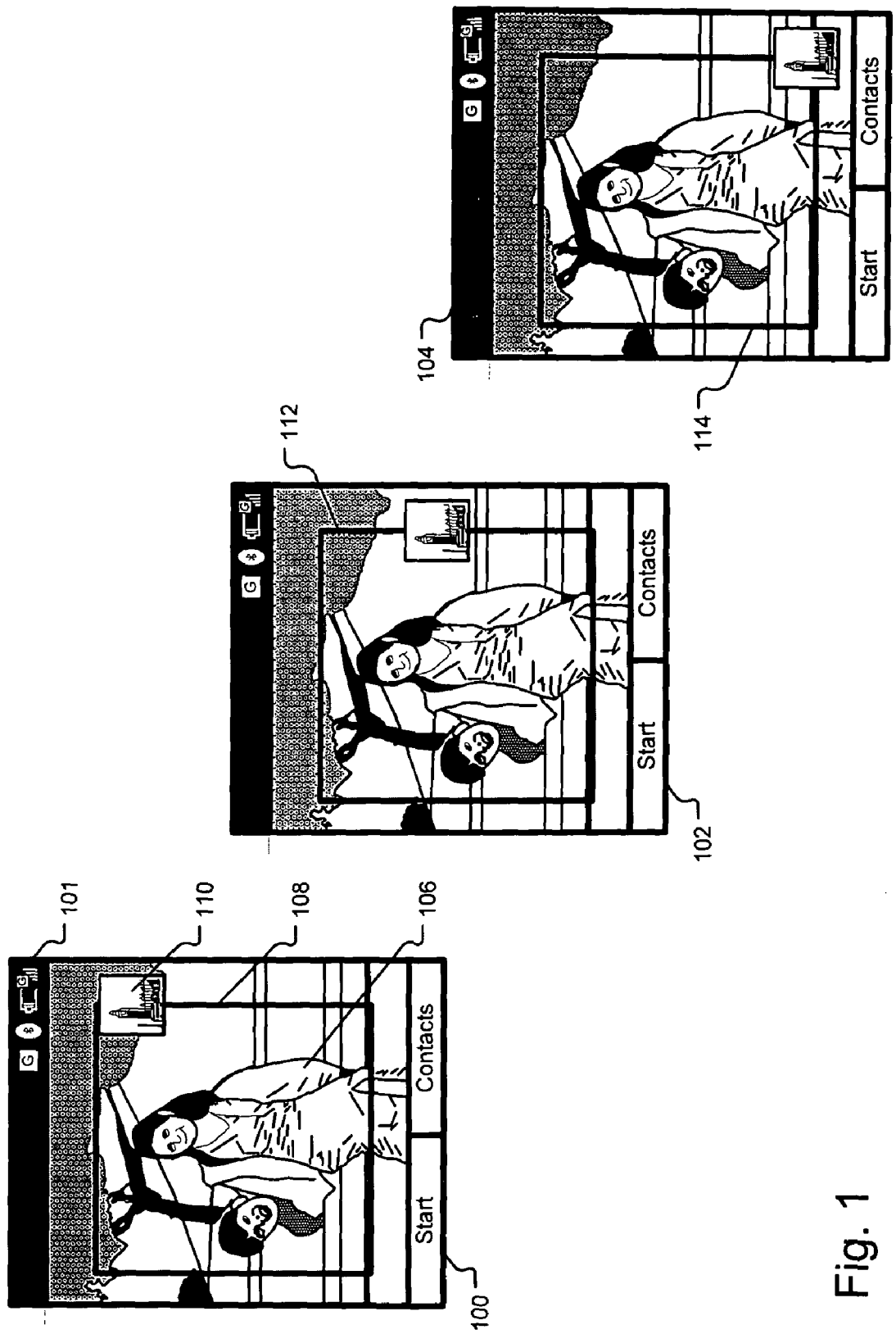
FIG. 1 illustrates an example user interface sequence on a client communications device.

FIG. 1 illustrates an example user interface sequence, including displays 100, 102, and 104, on a mobile wireless communications device. The displays 100, 102 and 104 represent a sequence of temporally different display frames on a mobile telephone display, although other mobile wireless communications devices are also contemplated. The panel 101 displays a square-G icon indicating a General Packet Radio Service (GPRS) connection, an icon indicating a Bluetooth connection (e.g., with a Global System for Mobile Communications (GSM) transceiver, heartbeat monitor, or other device), an icon indicating the battery charge level of the mobile telephone, and an icon indicating the strength of the wireless communications signal (e.g., a GSM communications signal in the case of the example mobile telephone of FIG. 1).

Although FIG. 1 shows a display from a mobile wireless communications device, it should be understood that other communications devices may be employed, including desktop computers, televisions with set-top boxes, wired telephones, internet appliances, etc. The communications device can execute a client application and connect through a transfer protocol to the aggregation server and personalized content deliver service. For example, in one implementation, a desktop computer can display a window of a designated size on the user's desktop or other display area with similar content as shown in FIG. 1, with or without indicators about network connectivity, power, etc. The windows can be further decorated with a frame around the display area, such as by a picture frame, a flowered border, or other decorative effects.

Other signaling protocols may be supported in any combination by an example mobile wireless communications device, including without limitations Code Division Multiple Access (CDMA), Universal Mobile Telecommunications System (UMTS), and any other network telephony protocol. Data can be alternatively or simultaneously communicated using Circuit Switched Data (CSD), GPRS, High Speed Downlink Packet Access (HSDPA), Bluetooth, wireless local area network (WLAN), or any other data transfer protocol.

In one implementation, a recipient user can identify a source user from which to obtain personalized information via a personalized information communications system. In one implementation, the recipient user selects a source user from a list (e.g., a buddy list) of available source users (e.g., those users registered with the personalized information service and having content accessible through the service), although other methods may be employed. While the recipient user's communications device obtains (e.g., periodically) personalized information of the source user, the device displays the information in dedicated area or areas of a display, e.g., a home screen view of a mobile phone, or some other pervasive display associated with the communications service. As such, the source user can configure server-based settings to provide personalized information for access by the recipient user's communications device.

In FIG. 1, each display frame in the displays 100, 102, and 104 represents a display at a different time of day and provides a home screen view with a foreground image and a background image, based on a time zone display definition or template set by the source user. In display 100, a background image 106 of two children posing in a park is overlaid by a clock template display 108 containing a foreground image 110 of the Clock Tower of Westminster in London. In one implementation, the clock template display 108 is defined by an Extensible Markup Language (XML) template representation, although other definition formats are contemplated. As can be seen from the display frame sequences in displays 100, 102, and 104, the location of the foreground image 110 in the clock template display changes to represent the time as time progresses (see e.g., clock template displays 108—2:00, 112—3:00, and 114—4:30). In the case of FIG. 1, the time zone displayed by the clock template 110 is Greenwich Mean Time (GMT), as specified by the source user's time zone setting, even though the recipient user is located in the Pacific Standard Time zone.

The settings resulting in the specific content and layout of the display are controlled by the source user via a Web-connected administrative client. For example, if a business woman is traveling abroad, a daughter back home can operate her home computer to specify images that she wishes her mother to see during the day. The daughter can update the images at her discretion and provide other data, which her mother can attend to at her convenience. Likewise, by viewing the time zone template display, the business woman can easily keep track of the time back home, so she can synchronize her calls, her emails, and her thoughts with her daughter's schedule (e.g., bedtime, return from school, etc.).

Figure 2:
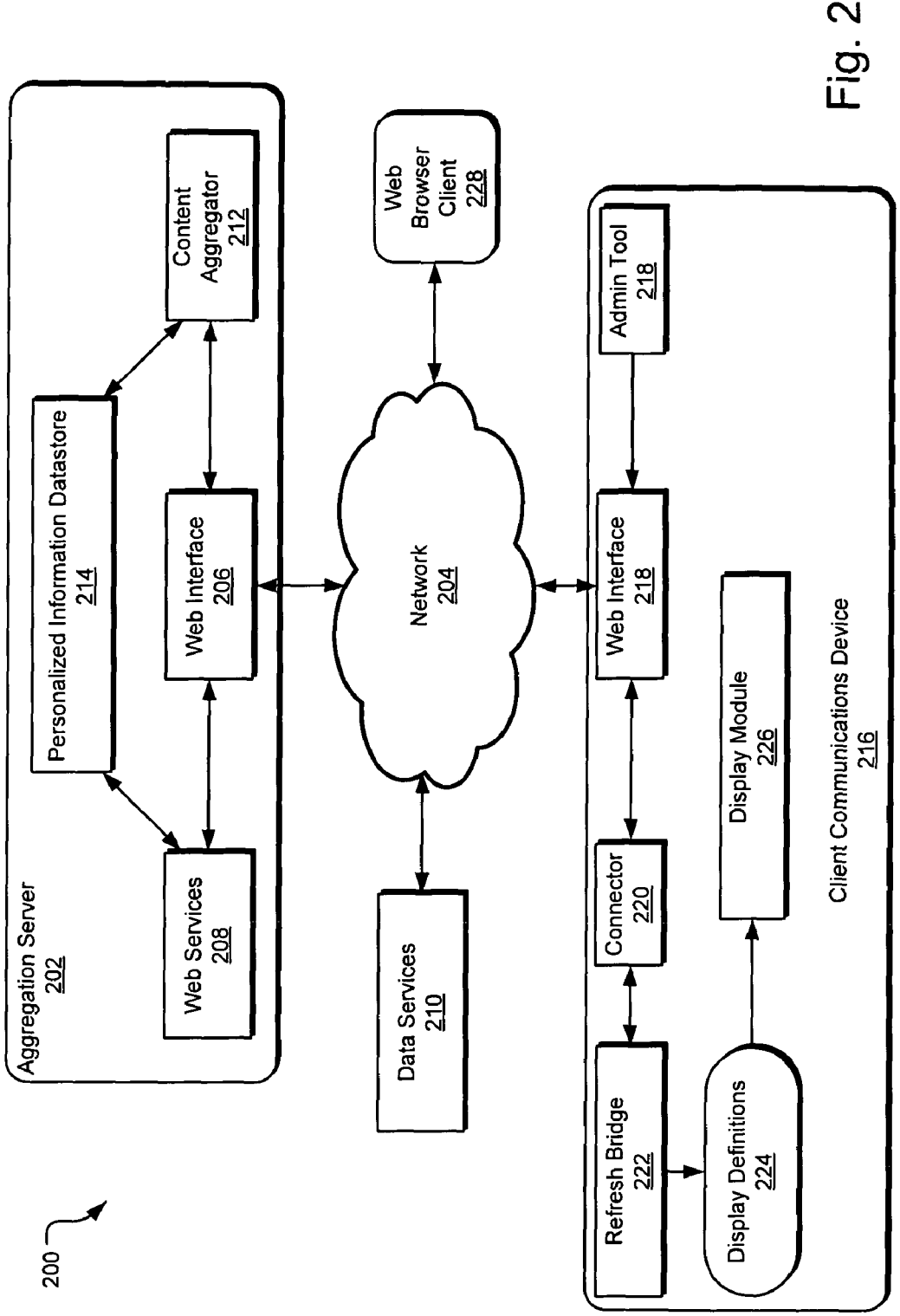
FIG. 2 illustrates an example configuration of a personalized information communications system.

FIG. 2 illustrates an example configuration 200 of a personalized information communications system. An aggregation server 202 represents a server that collects, stores, and serves personalized information to and from users via a network 204. It should be understood that the network 204 may be a collection of different networks, which may support a variety of networking protocols, channels, and devices.

Mobile and non-mobile clients can access the aggregation server 202 via a web interface 206, which typically supports HyperText Transport Protocol (HTTP), Simple Object Access Protocol (SOAP), and/or XML. Mobile clients can access a web services module 208 via the web interface 206. Web services are software applications identified by a URL, whose interfaces and bindings are capable of being defined, described, and discovered, such as by XML artifacts. A web service supports direct interactions with other software agents using (e.g., XML-based) messages exchanged over the network 204 (e.g., the Internet) and used remotely. A web service is accessible through a standard interface, thereby allowing heterogeneous systems to work together as a single web of computation. Web services use these standardized protocols (e.g., HTTP, SOAP, XML, etc.) to exchange data between systems that might otherwise be completely incompatible. Likewise, the aggregation server 202 can communicate with other data services 210 (such as a remote web service for obtaining weather information, time information, etc.) via a content aggregator 212 and the web interface 206, again via standardized protocols such as HTTP, SOAP, XML, etc. The content aggregator 212 uses appropriate communication protocols to obtain information from web services or other data resources. The content aggregator 212 merges this information with the user's personal information and thus facilitates the provision and display of the aggregated personalized information.

A client communications device 216 includes a web interface 218 for accessing the web interface 206 of the aggregation server 202 through the network 204. Through interaction with the aggregation server 202, the client communications device 216 can provide and obtain updated display data and user settings for use in personalized information communications. For example, the client communications device 216 can execute an administrative tool 218 (see e.g., FIG. 9) that allows the source user to control the personalized information that a specified recipient user would see if the recipient user "connects" with the source user (e.g., by logging into the personalized information communications system and requesting information associated with the source user). Using the administrative tool 218, the source user can access the web services module 208 via the web interface 206 to record the personalized information in a personalized information datastore 214. In one implementation, the datastore 214 is in the form of an SQL database, although other datastore forms are contemplated including other relational databases, file systems and other data organizations. In one implementation, the web services module 208 accesses the datastore 214 via a data access component, such as ADO-.NET.

Likewise, the client communications device 216 includes a connector 220, which connects with the personalized information of another user through the web service 208. Once connected, in one implementation, the connector 220 periodically polls the web service 208 for updated personalized information stored in the datastore 214 by the other user or obtained via the data services 210. Alternatively, an aggregation server 202 may provide a push-based service, such as one based on WapPush, or Multimedia Message Service (MMS). In the polling configuration, the time duration between periodic polling events is enforced by the client communications device (e.g., a user setting in the mobile device). In one implementation, the personalized information retrieved from the datastore 214 includes one or more images and other data that can be used to populate at least one display definition 224 for display by a display module 226. In one implementation, population of a display definition may be achieved by replacing a file containing a display definition of a currently displayed frame with a file containing the updated data. A refresh bridge 222 triggers the display module 226 to redraw the display based on the current display definition or template (e.g., sending the new file to the display module).

In one implementation, a display definition or template includes an XML home screen definition that can be displayed on the client communications device 216 via a display module 226 (e.g., a COM component plug-in for the home screen display). In one example, a template consists of a number of sections that describe various attributes of the display (e.g., images, locations, animations, fonts, etc.). The connector 220 retrieves the name of the template to be used as specified in the user settings by the source user. It should be understood that, in some implementations, display definitions can be cached in the client communications device 216 so that an update to the display need not require an additional access to the aggregation server 202. If the template does not exist within a cache on the communications device, then it is retrieved through the aggregation server. The template is read by the display module 226, which then displays the source user information from the display definitions 224 in the specified manner. An example template content is shown below:

```
(1)   <?xml version="1.0" ?>
(2)   - <home>
(3)     <author>Microsoft Corporation</author>
(4)     <contacturl>http://www.microsoft.com/</contacturl>
(5)     <title lang="0x0409">StockTimeZoneTemplate</title>
(6)     <version>1.0</version>
(7)     - <default font-face="nina" font-size="14" font-weight="bold"
          padding-left="4" padding-right="4" bgcolor="transparent"
          fgcolor="COLOR_HOMETEXT" padding-top="2" b-
          border-color="COLOR_HOMERULE" b-border-
          width="1">
```

-continued

```
(8)     <format state="selected" fgcolor=
          "COLOR_HOMEHIGHLIGHTTEXT" />
(9)     </default>
(10)    <background bgimage="background.bmp" valign="bottom" />
(11)    <foreground fgimage="westminster.png" />
(12)   - <scheme>
(13)    <color name="COLOR_HIGHLIGHT" value="#2A2CC5" />
(14)    <mode name="TIMEZONE" GMTPlus="3" Animate="Hour"
          Tick="Minute" />
(15)    <refresh serverupdate="6" Unit="hour" />
(16)   </scheme>
(17)  </home>
```

The example template includes:
Lines 7 and 8—define fonts and colors of the display
Lines 9-11—define the background and foreground images of the display
Lines 12-16—define the display mode and the refresh rate associated with polling the aggregation server A web browser client 228 (an example client communications device) can also access the datastore 214 via the web interface 206 to configure the personalized information that a user to share with one or more other users (see e.g., FIGS. 5-8).

Figure 3:
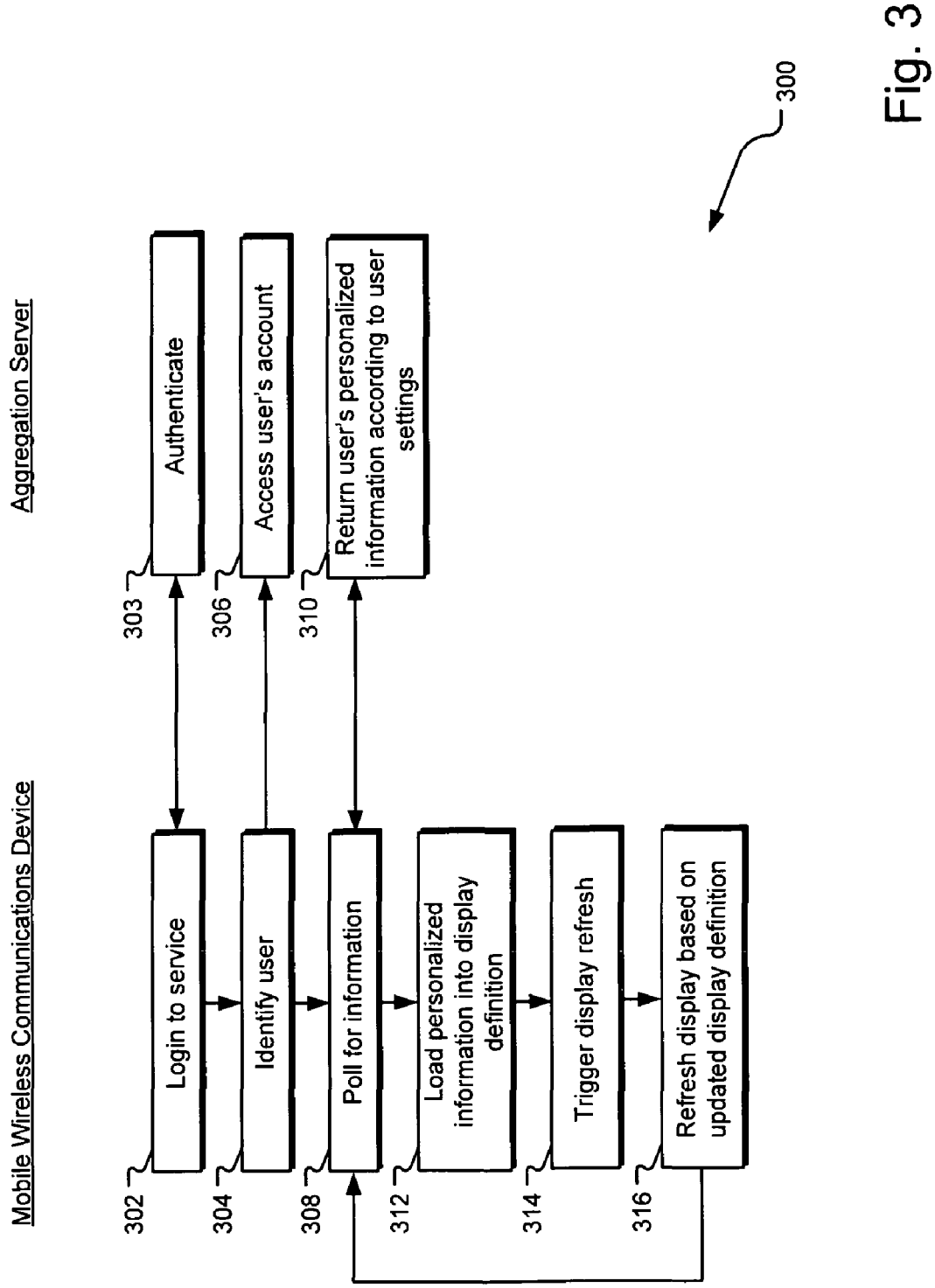
FIG. 3 illustrates example operations for providing personalized communications via a client communications device.

FIG. 3 illustrates example operations 300 for providing personalized communications via a client communications device. A login operation 302 logs a recipient user into an aggregation server via the recipient user's client communications device. In an authentication operation 303, the aggregation server authenticates the recipient user and then allows access to the source user's data in a context datastore. It should be understood that some implementations need not authenticate the recipient user.

An identification operation 304 identifies a source user whose personalized information the recipient user wishes to receive via the personalized communications system. In one implementation, the recipient user provides a phone number or some other user identifier to identify the desired source user (and/or the source user's personalized information account). An access operation 306 on the aggregation server accesses the identified source user's personalized information account and associates the recipient and source users for the purpose of providing the source user's personalized information to the recipient user (e.g., upon request or based on a push paradigm). It should also be understood that, depending on the source user's settings, a content aggregator may be accessing data services over a network to obtain supplementary information based on the source user's settings. For example, based on a location setting, the content aggregator can access a weather web service to determine the weather at that location and therefore set the effect to reflect the determined weather conditions (see e.g., FIG. 10).

A polling operation 308 periodically requests the user's personalized information from web service of the aggregation server, which accesses the user's records in the datastore and returns them to the mobile wireless communications device in return operation 310. The personalized information is returned in accordance with the user settings set by the source user via an administrative tool on another mobile device or a web browser client. For example, if the source user specified a location mode for the personalized information, the specified location image and sequence of effect images are transmitted to the mobile wireless communications device, in accordance with the location template. It should be understood that a location image acts as a background image behind the overlay of the effect images.

In an alternative implementation, the polling approach is replaced with push technology, in which content is delivered to the client communications device. For example, one type of push technology may be implemented using WAPPush. WAP Push can be described as specially formatted SMS message with a URL included in the header. The URL typically links to a WAP address, although it can also lead to an XHTML site, a CHTML site (i-mode), or a normal website. On receiving a WAP Push message, a compatible client communications device can automatically give the user access to the WAP content (e.g., the content may be retrieved from the URL location and displayed on the home screen of the device). Alternatively, the communications service can send notification to the recipient user's client application that new content is available. The recipient's client application can be configured to respond to the notification to perform automatic polling from the communications service. Other types of push technology may alternatively be employed.

A loading operation 312 loads the personalized information received from the aggregation server into a display definition on the client communications device. In one implementation, the loading operation 312 replaces one or more files on the client device. Then, a trigger operation 312 causes a display module to refresh the display of the client communication device based on the new files in a refresh operation 316, which provides a continuous or semi-continuous freshness to the displayed data. For example, the display may be refreshed on a periodic schedule, which may or may not be synchronized with update requests or "pushes" from the aggregation server. Alternatively, the display refreshes may be triggered in response to receipt of updated information from the aggregation server.

In one implementation, the client communications device receives various images and other user settings from a web service of the aggregation server. The appropriate template may also be transmitted to the client device or may be persistently stored on the client device and only specified by a user setting. A template describes the layout of the display in terms of its constituent images (e.g., one or more images, effects, icons, relative locations, etc.). A display module on the client device (e.g., a COM component plug for the home screen of the client device) interprets the template and draws the personalized information received from the aggregation server on the display of the client device.

Figure 4:
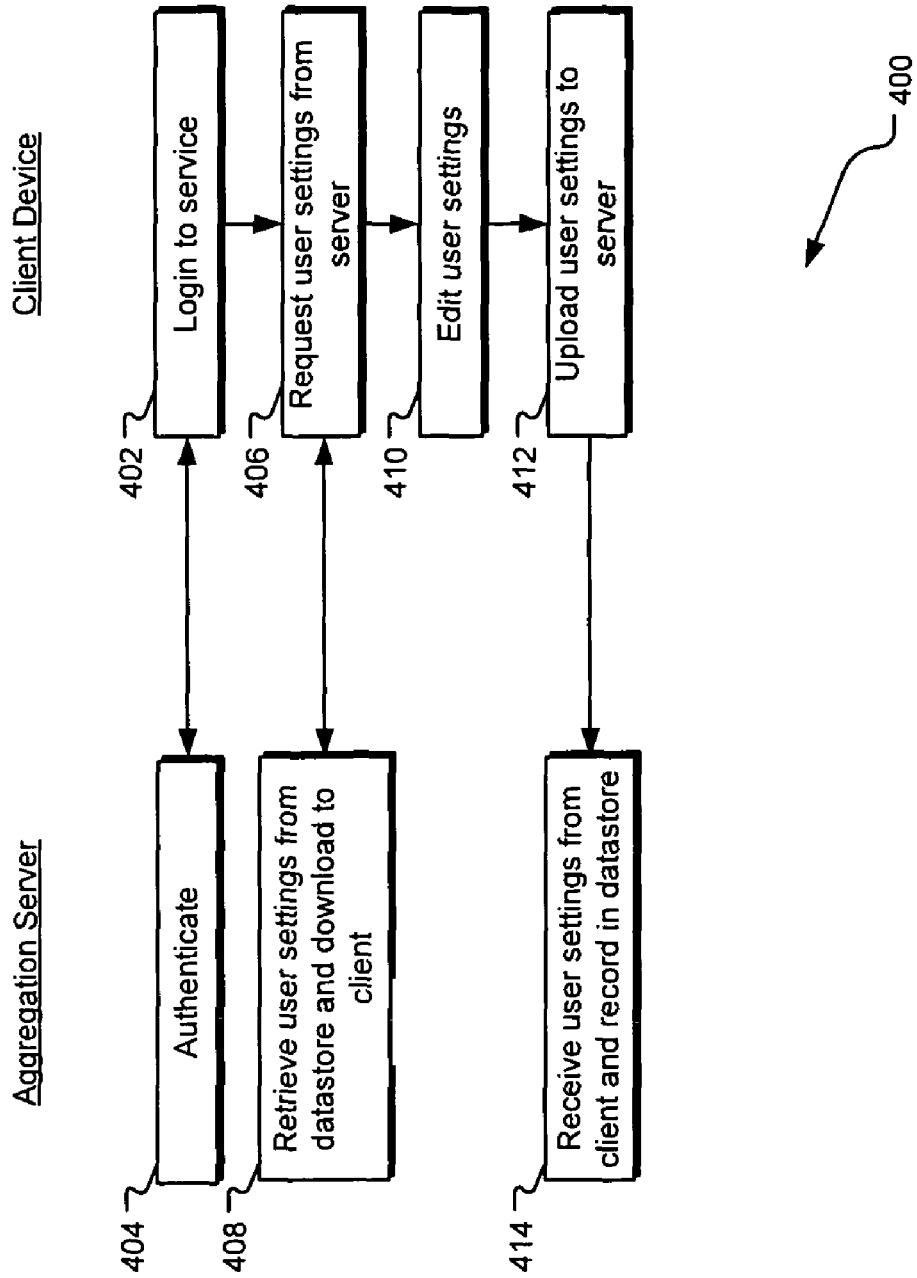
FIG. 4 illustrates example operations for administering user information in a personalized information communications system.

FIG. 4 illustrates example operations 400 for administering user information in a personalized information communications system. A login operation 402 logs a source user into an aggregation server via the source user's client communications device (e.g., a mobile wireless communications device and/or a web browser client). In an authentication operation 404, the aggregation server authenticates the source user and then allows access to the source user's data in a context datastore. It should be understood that some implementations need not authenticate the source user.

A request operation 406 requests the source user's settings from the aggregation server. A retrieval operation 408 on the aggregation server accesses the source user settings in the datastore and downloads them to the source user's client communications device. An edit operation 410 edits the user settings per the source user's actions (see FIGS. 5-8). An uploading operation 412 transmits the edited source user settings to the aggregation server, which records the source user settings in a receiving operation 414.

Figure 5:
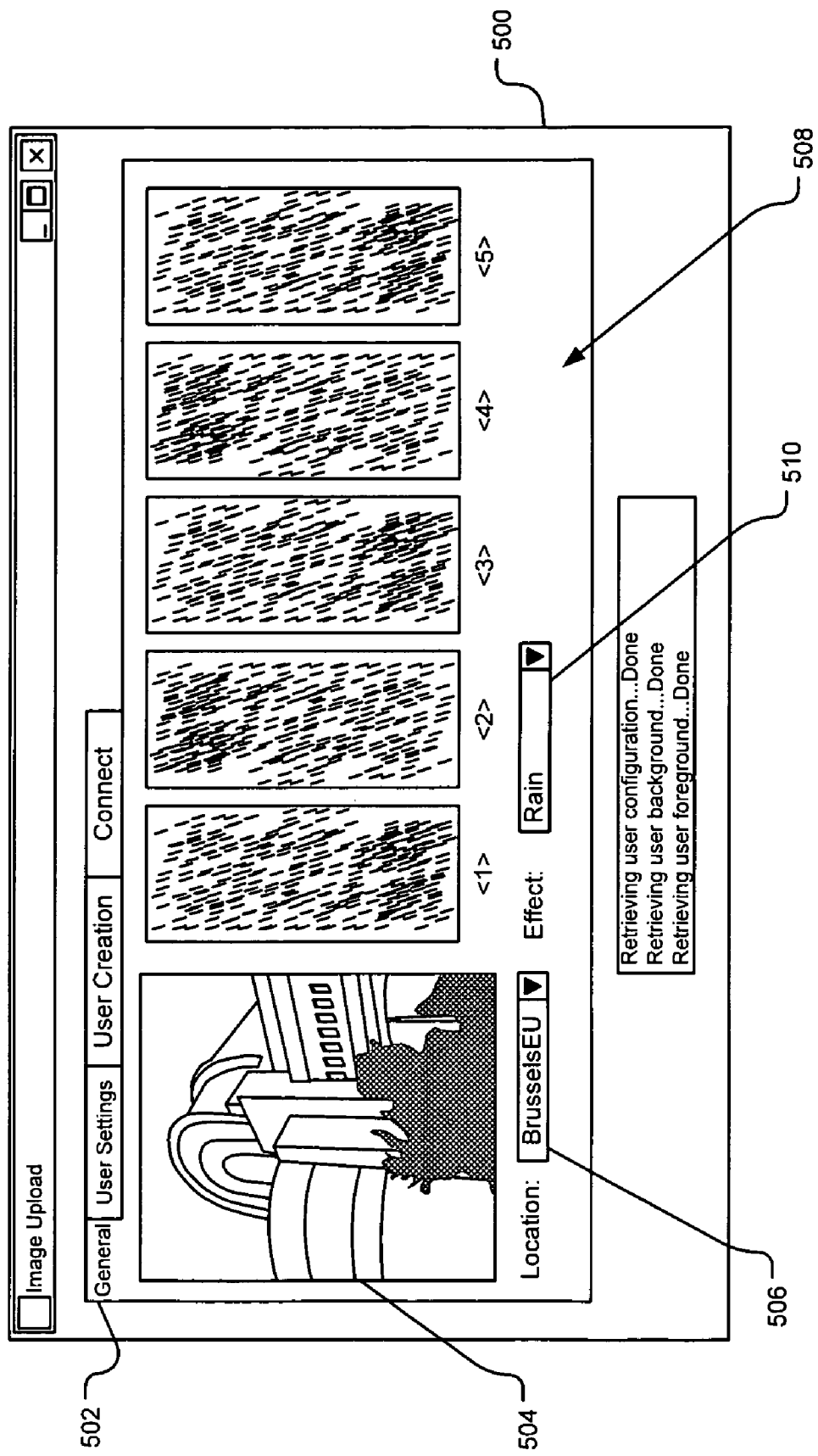
FIG. 5 illustrates an example home screen configuration screen display on an administrative client of a personalized information communications system.

FIG. 5 illustrates an example content display configuration manager display 500 in an administrative tool (e.g., on web browser client 228 of FIG. 2) of a personalized information communications system. The illustrated home screen represents a display of a web browsing client (e.g., a desktop system). However, it should be understood that an administrative tool on a mobile client can also implement similar functionality in some implementations (see e.g., FIG. 9).

Under the "General" tab 502, a source user can upload a location image to a personalized information datastore. In one implementation, the source user can right-click within the Location image box 504 to display a context menu. From the context menu, the user can select Browse to browse for and select a desired location image. The source user can also specify a location identifier 506 (e.g., "BrusselsEU") to associate with the location image for later referencing.

Under the "General" tab 502, a source user can also upload a plurality of partially transparent images 508 constituting an effect. Each effect image includes at least a portion of the image having a non-zero transparency level so that the effect image can overlay another image while exposing of portion of the underlying image for viewing. In one implementation, the source user can right-click within each Effect image box 508 to display a context menu. From the context menu, the source user can select Browse to browse for and select a desired effect image. The images 508 represent individual display frames that can be displayed in sequence on the client communications device to provide animation. Specifically, the example images 508 can provide an animated overlay representing a rain shower overlaying the location image 504 when displayed in sequence (in flipbook style with a slight time delay between images) on the client communications device. The source user can also specify an effect identifier 510 (e.g., "rain") to associate with the effect images for later referencing.

Through the context menus, the user can also select Upload to upload the selected images to a datastore on the aggregation server. Individual images can be in any graphics format, although in one implementation, the location image is defined by a bitmap (bmp) format and the effects images are defined in Portable Network Graphics (png) format with an alpha transparency characteristic set to provide an overlay appearance. A source user can also download individual images from the datastore by entering a location identifier or effect identifier into the appropriate form field (i.e., the "Location:" field or the "Effect:" field).

Figure 6:
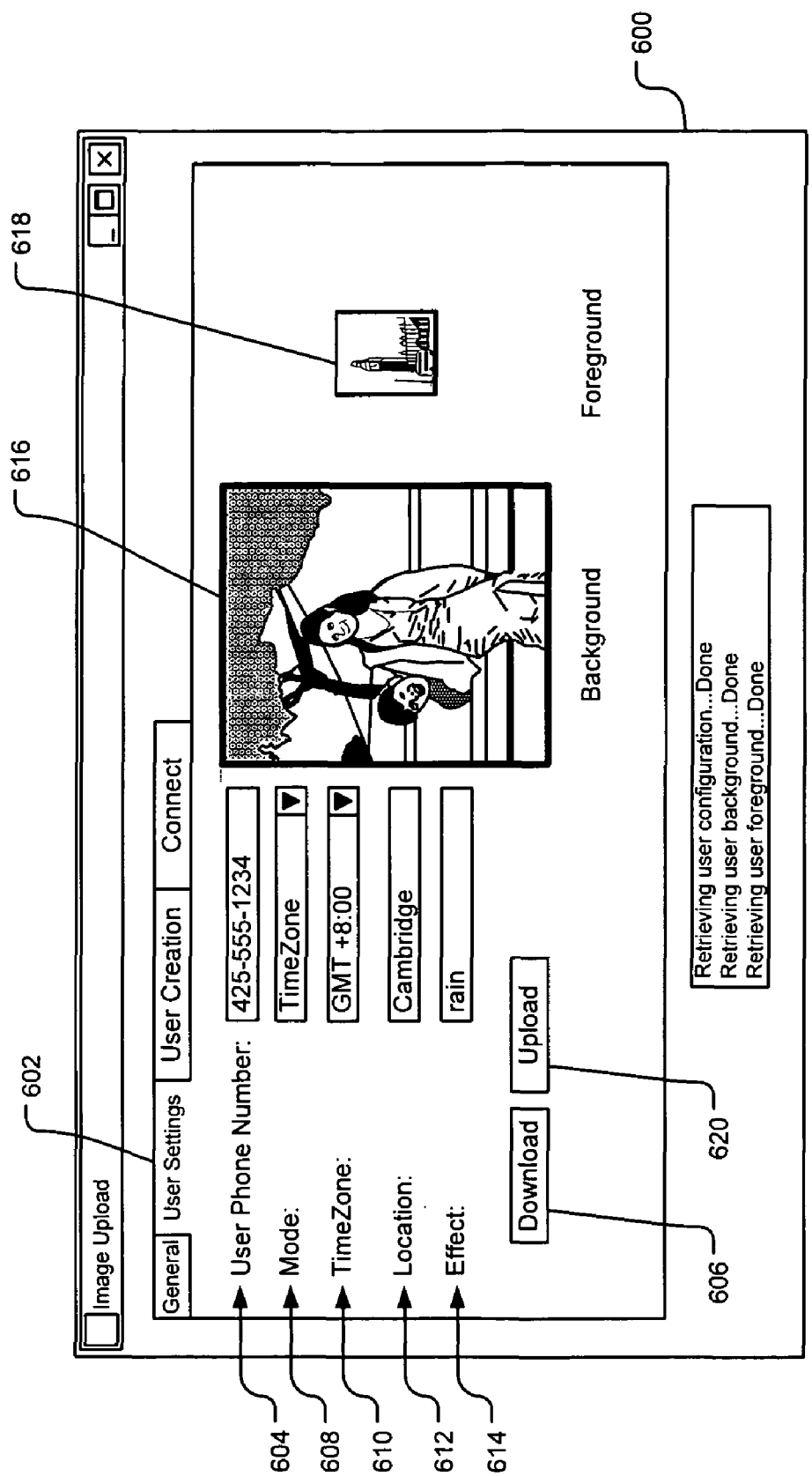
FIG. 6 illustrates an example user settings screen display on an administrative client of a personalized information communications system.

FIG. 6 illustrates an example source user settings screen display in an administrative tool (e.g., on web browser client 228 of FIG. 2) of a personalized information communications system. The illustrated settings screen represents a display of a web browsing client (e.g., a desktop system). However, it should be understood that an administrative tool on a mobile client can also implement similar functionality in some implementations (see e.g., FIG. 9).

Under the "User Settings" tab 602, a source user can specify the personal information he or she wish to send to one or more recipient users. The source user can identify himself or herself by providing a phone number in the "User Phone Number:" field 604. By selecting the download button 606, the source user can then download his or her current user settings, such as mode setting 608, time zone setting 610, location setting 612, effect setting 614, foreground image 616, and background image 618, and alter these settings. The source user can then update his or her settings using the upload button 620. The mode setting 608 specifies which mode template to employ in the display on the client communications device. In one implementation, a TimeZone mode provides a display similar to that shown in FIG. 1. In another implementation, a Location mode provides a location image and an effects overlay, such as discussed with regard to FIGS. 5 and 10.

Although the time zone 610, the location 612, the effect 614, and the foreground and background images 614 and 616 can be specified in the example user interface FIG. 6, in another implementation, information pertaining to one or more of these characteristics can be obtained via another data service (e.g., a clock web service, a weather web service, etc.). For example, rather than the source user specifying "rain" in his or her user settings, the current weather reported at the specified location can be received from a weather web service and therefore the effect setting can be automatically configured in the datastore based on this report. Likewise, the location can be identified and mapped to a location identifier and/or a time zone using a Global Positioning System (GPS) and a mapping and/or time web service. In an implementation of the latter case, location information can be obtained automatically from a mobile service provider on the GSM network or a wireless network provider of other devices used for communication, such as nearby laptop computers and/or mobile phones. Location information can then sent to the aggregator service that can utilize this data to make API calls for complementary information (e.g., maps, time, local information) from the online mapping services.

Figure 7:
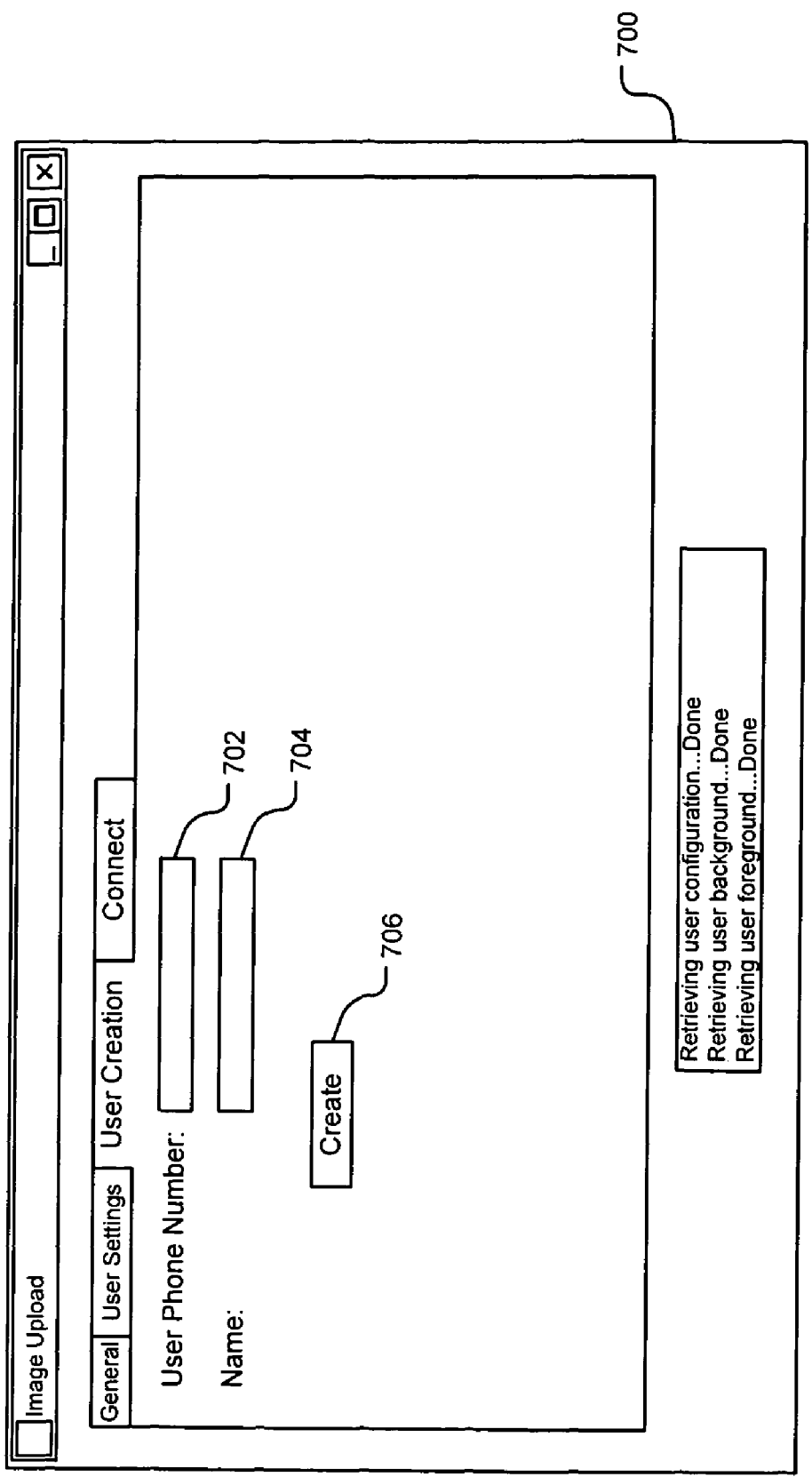
FIG. 7 illustrates an example user creation screen display on an administrative client of a personalized information communications system.

FIG. 7 illustrates an example user creation screen display 700 in an administrative tool (e.g., on web browser client 228 of FIG. 2) of a personalized information communications system. The illustrated user creation screen represents a display of a web browsing client (e.g., a desktop system). However, it should be understood that an administrative tool on a mobile client can also implement similar functionality in some implementations (see e.g., FIG. 9). In an alternative implementation, the source user can preview the final layout that results from the selected content and display template before completing the specification of the settings.

Under the "User Creation" tab 702, a source user can create an account on the aggregation server in which to store personalized information. By entering his or her phone number (in field 704) and an identifier (e.g., a name in field 706), and selecting the "Create" button 708, the source user creates a user account of personalized information on the aggregation server, including data structures for images and other user settings. From this account, the specified personalized information can be accessed by a mobile wireless communications device of one or more recipient users, as described herein.

Figure 8:
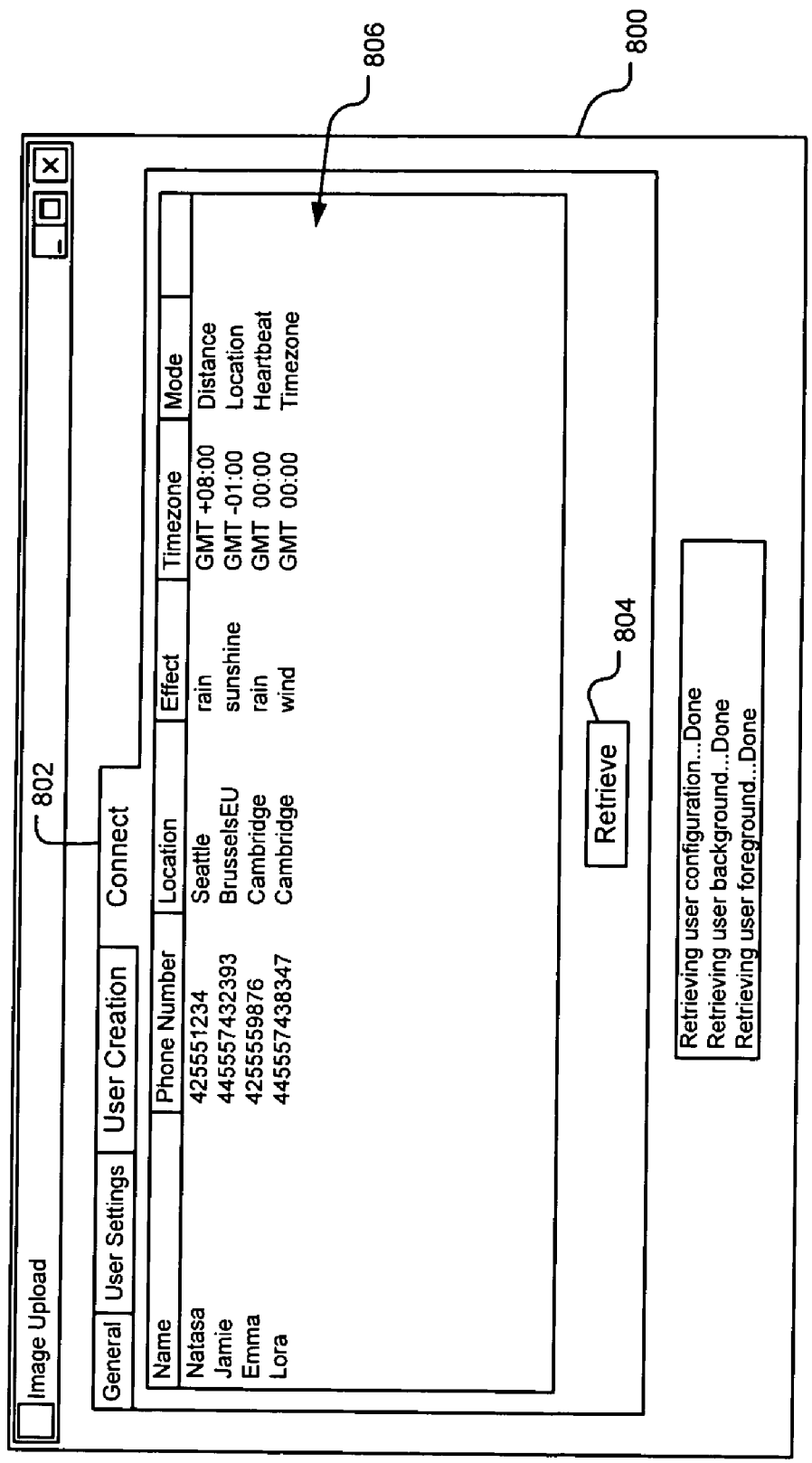
FIG. 8 illustrates an example connections screen display on an administrative client of a personalized information communications system.

FIG. 8 illustrates an example connections screen display 800 in an administrative tool (e.g., on web browser client 228 of FIG. 2) of a personalized information communications system. The illustrated connections screen represents a display of a web browsing client (e.g., a desktop system). However, it should be understood that an administrative tool on a mobile client can also implement similar functionality in some implementations (see e.g., FIG. 9). Under the "Connect" tab 802, a source user can retrieve (using the "Retrieve" button 804) the user settings of other users registered with the personalized information communications system and display them in the user settings window 806. The source user can select an individual recipient user or a group of recipient users with whom to establish communication.

Example effects not previously discussed may include without limitation "wind" and "sunshine" effects. In one implementation, the wind effect is represented by a sequence of effect images showing an animated leaf blowing around the screen of the mobile wireless communications device. In another implementation, the sunshine effect is represented by a subtly pulsing yellow glow overlaying a background image. Furthermore, another rain effect may display realistic animated "water" overlaying a background image and appearing to trickle down the lens. Such effects can be uploaded by a user or selected from a set of provided effects images on the aggregation server or client device. Other effects may be provided in alternative implementations.

Example modes not previously discussed may include without limitation "heartbeat" and "distance" modes. In one implementation, a heartbeat mode receives a heartbeat signal from a biofeedback sensor on the user. The rhythm or frequency of the heartbeat signal is recorded in the datastore in association with the user's phone number. Other recipient users who login to receive personalized information from the source user can view a pulsing display (e.g., a pulsing, glowing rose, heart, or other icon, etc.) or an electronic heartbeat trace across the display and overlaying a background image specified by the source user.

In contrast, a distance mode can display a representation of the positional distance between the source user and recipient user. For example, if both users transmit their locations (e.g., GPS location data or manually entered location data) to their accounts, the aggregation server can send a value representing the distance between the two users, such that as the users get closer in proximity, the display indicates the changing distance using a distance indicator (e.g., a radar-like representation or a linear graphic that shrinks and grows in accordance with distance) overlaying a background image. It should be understood that more than two users may participate in such communications.

Figure 9:
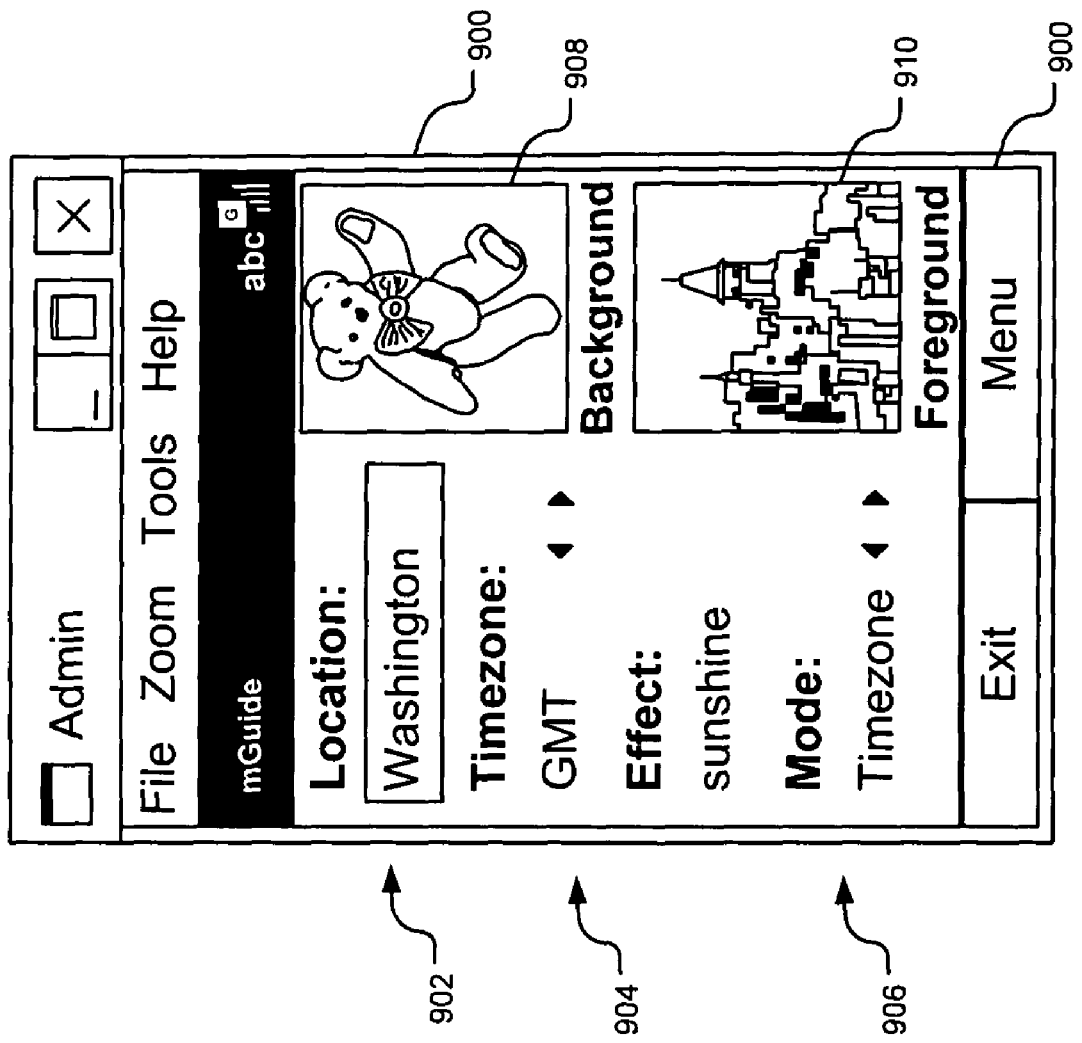
FIG. 9 illustrates an example administrative screen display on a mobile wireless communications device.

FIG. 9 illustrates an example administrative screen display 900 on a mobile wireless communications device. Like the administrative client discussed with regard to FIGS. 5-8, the mobile wireless communication device can allow a mobile user to alter personal user settings to configure personalized information that can be transmitted to other users. As with FIG. 6, the administrative screen displays 900 shows inputs for entering or editing a location value (902), a time zone value (904), a mode value (906), a foreground image (908) and a background image (910). As with the administrative client discussed with regard to FIGS. 5-8, one or more of the location value, time zone value, and/or other values can be received from an external data service.

A menu 912 provides access to other features:

| Menu Item | Description |
| --- | --- |
| Capture Image | Executes a camera feature to capture an image using the mobile device's camera; stores the captured image in persistent storage to allow the user to select the image as a location, background, or foreground image |
| Select foreground | Opens a browsing display to allow the user to select a foreground image |
| Select background | Opens a browsing display to allow the user to select a background image |
| Update settings | Uploads the user's settings by transmitting the settings to the datastore at the aggregation server |
| Login | Logs the user into the personalized information communications system to allow access to the user's account and/or another user's personalized information |

The recipient user can select the source user or users from whom he or she wishes to receive personalized information communications. Although other methods may be employed, in one implementation, the recipient user accesses a list of registered source users, such as a buddy list. From the list, the recipient user can verify whether the personalized information communications channel for the source user is active and whether the source user is sharing personalized information content. The recipient user can also be notified by a source user of a reactivated channel with the new content.

Figure 10:
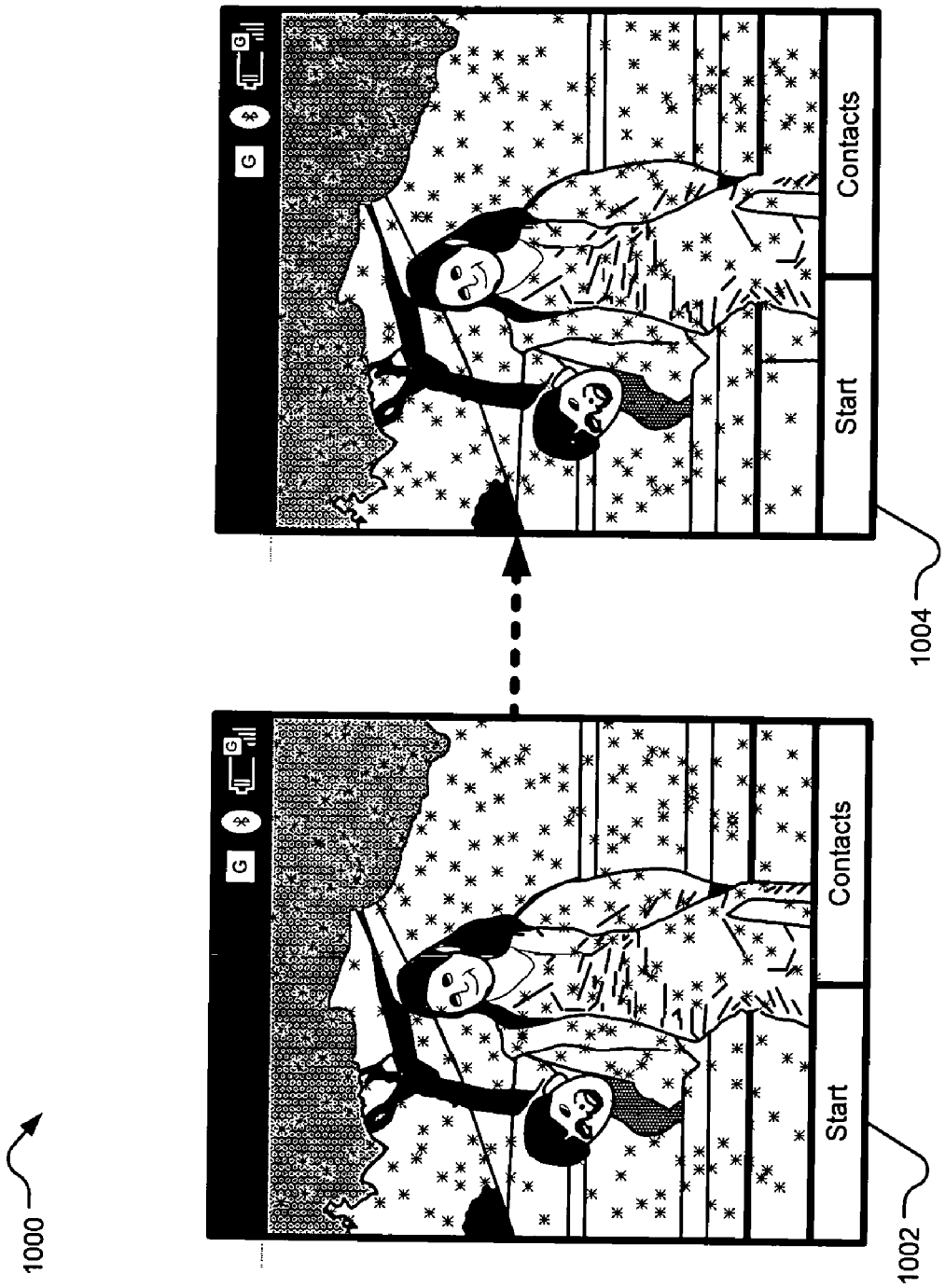
FIG. 10 illustrates another example user interface sequence on a client communications device.

FIG. 10 illustrates another example user interface sequence 1000 on a mobile wireless communications device. A first display frame 1002 includes a background image of two children in a park and an effects overlay representing snow flakes. A second display frame 1004 includes the same background image of the two children in the park, but shows a slightly different effects overlay representing snow flakes. When the overlays (i.e., these two overlays or a sequence of additional overlays) are displayed in sequence, the snow appears to fall in an animated fashion providing a sense of physically being with the children, in a park, during a light snow.

It should be understood that personalized information can also be displayed on an alternative communications device, such as a desktop computer, a television, a wired telephone, a videophone, etc. For example, the recipient user may run an application on a set-top box to display the source user's personalized information on a television set. Alternatively, a recipient user may run an application on a desktop computer to display the same information.

The location template can be configured to specify the order and/or frequency of updates to the overlay, such that a slow sequence of updates in one order can animate gently falling snow, whereas a faster sequence of updates in another order can animate a blizzard with a real-time data feed of the wind speed or other local parameters at a particular location. For example, a wind speed measurement can influence the refresh rate of the weather overlay, a temperature measurement can influence wither rain or snow is displayed, and a time value can influence the brightness of the display. The order and/or frequency can be set manually by the user or automatically via a web service.

Figure 11:
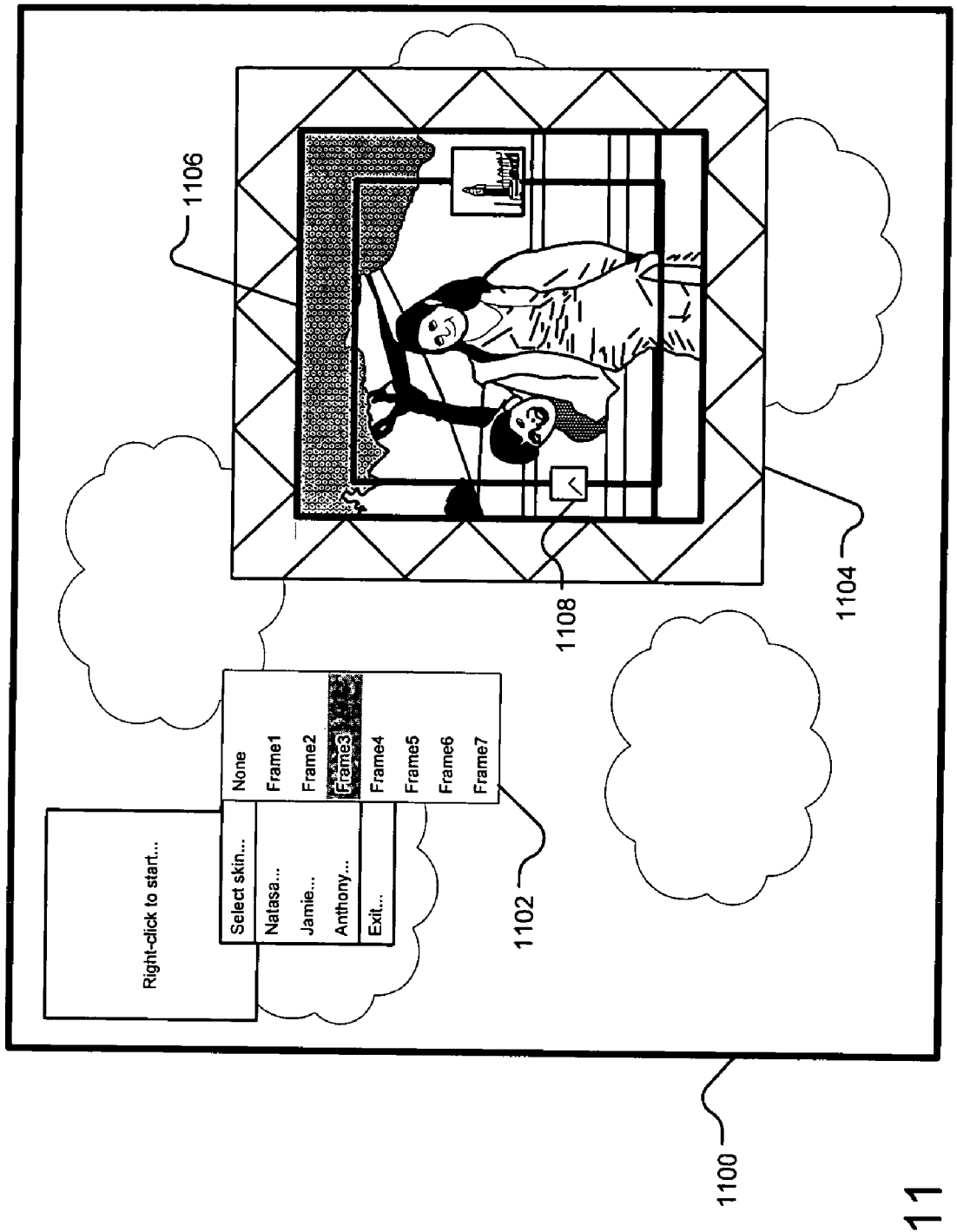
FIG. 11 illustrates an example user interface on a client communications device.

FIG. 11 illustrates an example user interface 1100 displayed on a client communications device. In the illustrated example, the example user interface 1100 is displayed on a desktop computer, but other client communication devices are also contemplated. FIG. 11 demonstrates an example in which the recipient user can alter or supplement the display template to customize the display on his or her device. In this case, the recipient user can select via a context menu 1102 a frame or "skin" 1104 to display around the display area 1106 of the personalized information designated by the source user. From the context menu 1102, the recipient user can select the source user to which the selected skin applies, as the recipient user may have multiple personalized information displays active on his or her desktop concurrently.

Figure 12:
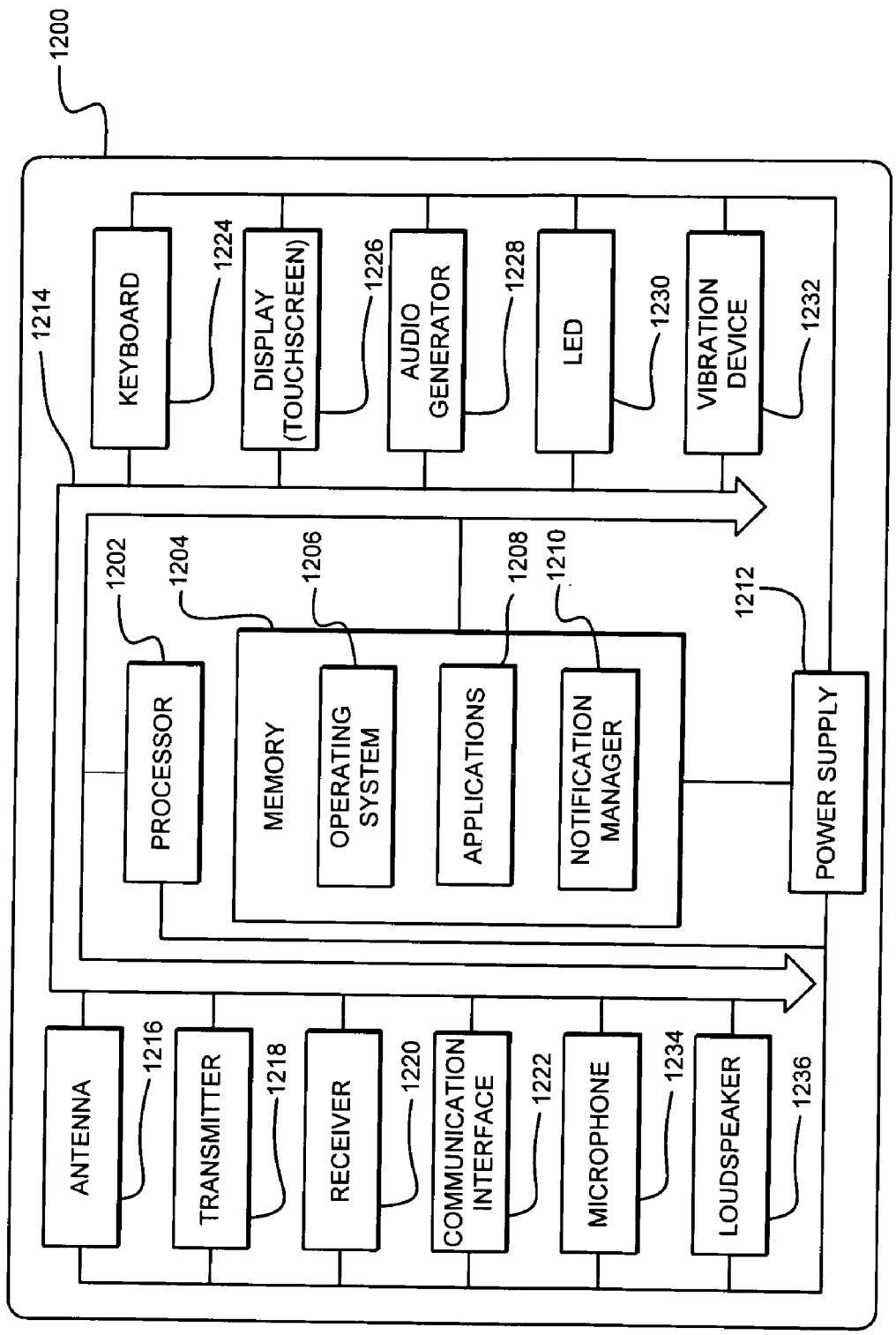
FIG. 12 illustrates an example mobile device that may be useful in implementing the described technology.

In one implementation, the selection of a skin by the recipient user results in modification of the display template (e.g., an editing of the XML received from the aggregation server). Alternatively, a supplemental display template may be employed. It is noted, also, that a "minute hand" feature 1108 is also displayed in the example in FIG. 11. The recipient user may control other aspects of the display, including size and aspect ratio of the personalized information display, board colors and thicknesses, the number of displays that are active concurrently, An example mobile device 1200 for useful as a mobile wireless communications device is depicted in FIG. 12. It should be understood that other mobile device configurations are also contemplated. The mobile device 1200 includes a processor 1202 and memory 1204 as in any standard computing device. The processor 1202, memory 1204, and other components hereinafter described may interface via a system bus 1214. The system bus 1214 may be any of several types of bus structures including a memory bus or memory controller, a peripheral bus, a switched fabric, point-to-point connections, and a local bus. The memory 1204 generally includes both volatile memory (e.g., RAM) and non-volatile memory (e.g., ROM or a PCMCIA card). An operating system 1206 may reside in the memory 1204 and execute on the processor 1202. An example operating system may be the WINDOWS® operating system from Microsoft Corporation.

One or more application programs 1206 may be loaded into the memory 1204 for execution by the processor 1202 in conjunction with the operating system 1206. Example applications may include aggregation client programs, electronic mail programs, scheduling programs, personal information management programs, word processing programs, spreadsheet programs, Internet browser programs, music file management programs, and photograph and video file management programs. The memory 1204 may further include a notification manager 1210, which executes on the processor 1202. The notification manager 1210 handles notification requests from the applications 1208 to one or more user notification devices as described in greater detail below.

The mobile device 1200 also has a power supply 1212, which may be implemented using one or more batteries. The power supply 1212 may also be from an external AC source through the use of a power cord or a powered data transfer cable connected with the mobile device 1200 that overrides or recharges the batteries. The power supply 1212 is connected to most, if not all, of the components of the mobile device 1200 in order for each of the components to operate.

In one implementation, the mobile device 1200 may include communications capabilities, for example, the mobile device 1200 operates as a wireless telephone. A wireless device 1200 with telephone capabilities generally includes an antenna 1216, a transmitter 1218, and a receiver 1220 for interfacing with a wireless telephony network. Additionally, the mobile device 1200 may include a microphone 1234 and loudspeaker 1236 in order for a user to telephonically communicate. The loudspeaker 1236 may also be in the form of a wired or wireless output port for connection with a wired or wireless earphone or headphone.

The mobile device 1200 may connect with numerous other networks, for example, a wireless LAN (WiFi) network, a wired LAN or WAN, GPRS, Bluetooth, UMTS or any other network via one or more communication interfaces 1222. The antenna 1216 or multiple antennae may be used for different communication purposes, for example, radio frequency identification (RFID), microwave transmissions and receptions, WiFi transmissions and receptions, and Bluetooth transmissions and receptions.

The mobile device 1200 further generally includes some type of user interface. As shown in FIG. 12, the mobile device 1200 may have a keyboard 1224 and a display 1226. The keyboard 1224 may be a limited numeric pad, a full "qwerty" keyboard, or a combination of both. The keyboard 1224 may also include specialty buttons, wheels, track balls, and other interface options, for example, menu selection or navigation keys or telephone function keys. In addition to depicting information, the display 1226 may also be a touch screen display that allows for data entry by touching the display screen with the user's finger or a stylus to make input selections via a graphical interface or write letters and numbers directly on the display 1226.

The mobile device 1200 may also have one or more external notification mechanisms. In the implementation depicted in FIG. 12, the mobile device 1200 includes an audio generator 1228, a light emitting diode (LED) 1230, and a vibration device 1232. These devices may be directly coupled to the power supply 1212 so that when activated, they may remain energized for a duration dictated by the notification manager 1210, even though the processor 1202 and other components may shut down to conserve battery power.

In an example implementation, an aggregation client, a refresh bridge, a connector, an administrative tool, a display module, and other modules may be embodied by instructions stored in memory 1204 and processed by the processing unit 1202. Foreground and background definitions, user settings, and other data may be stored in memory 1204 as persistent datastores.

Figure 13:
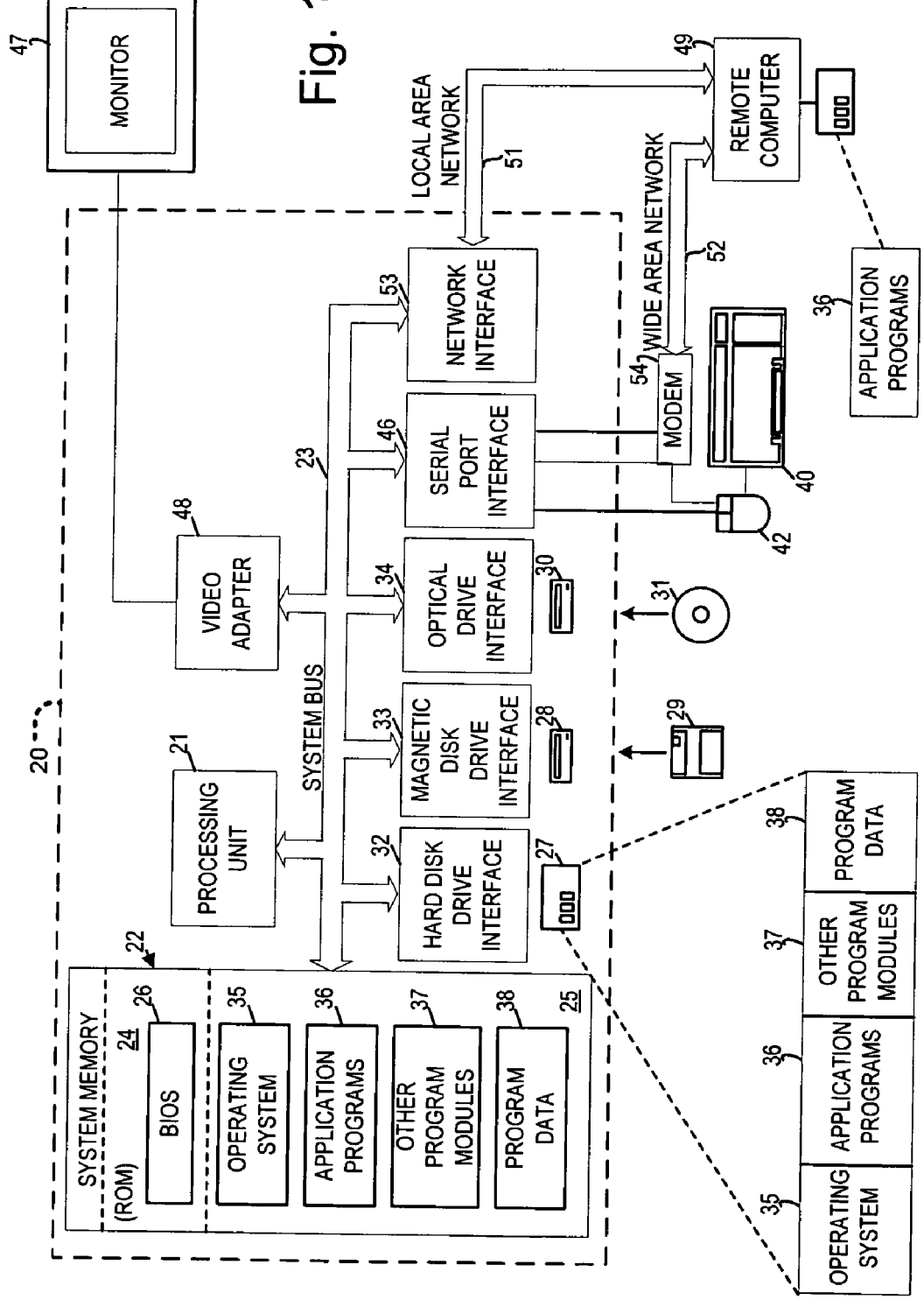
FIG. 13 illustrates an example system that may be useful in implementing the described technology.

The example hardware and operating environment of FIG. 13 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 13. The logical connections depicted in FIG. 13 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a web service module, a web interface module, a content aggregator module, an administrative module, and other modules may be embodied by instructions stored in memory 22 and/or storage devices 29 or 31 and processed by the processing unit 21. Foreground and background definitions, user settings, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of communicating source user information to a mobile communications device, the method comprising:
   recording, in a datastore of an aggregation server, personalized source user information including an uploaded photograph file provided by a source user, the photograph file comprising an image captured by a camera and to be accessed from the aggregation server by recipient users without active communication from the source user according to user settings specified by the source user, the user settings:
      identifying the source user by at least one of name and telephone number,
      identifying a location of the source user,
      identifying each of the recipient users by at least one of name and telephone number,
      referencing the source user information provided by the source user for receipt by the recipient users, and
      specifying an effect overlay selected by the source user for use when the photograph file is accessed by recipient users;
   transmitting, through a web service of the aggregation server, a list of users for display on the mobile communications device of a particular recipient user, the list of users comprising identifiers for the source user and other users having accessible personalized information;
   receiving, through the web service of the aggregation server, a request from the-particular recipient user via the mobile communications device in response to selection of an identifier for the source user from the list of users;
   associating the particular recipient user with the source user for providing the particular recipient with the personalized source user information provided by the source user;
   accessing, from the datastore of the aggregation server, the personalized source user information including the photograph file provided by the source user;
   requesting, by the aggregation server, supplemental information from a remote web service based on the location identified in the user settings of the source user;
   receiving, at the aggregation server, the supplemental information from the remote web service;
   selecting, by the aggregation server, one or more effect images associated with the effect overlay selected by the source user for use when the photograph file is accessed by recipient users, wherein:
      each effect image has a non-zero transparency level in at least a portion of the effect image to expose a portion of the image of the photograph file for viewing when overlaying the image of the photograph file, and
      the one or more effect images are selected based on the supplemental information received from the remote web service; and
   transmitting, through the web service of the aggregation server, the personalized source user information for display of the image of the photograph file provided by the source user and for display of the one or more effect images overlaying the image of the photograph file provided by the source user for viewing on the mobile communications device of the particular recipient user.

2. The method of claim 1 wherein the user settings further provide a display definition specified by the source user and associated with the personalized source user information, the associated display definition specifying layout of the image of the photograph file provided by the source user and the one or more effect images overlaying the image of the photograph file provided by the source user within a display on the mobile communications device of the particular recipient user.

3. The method of claim 2 wherein the associated display definition comprises a display template, the method further comprising:
   transmitting, through the web service of the aggregation server, the display template to the mobile communications device of the particular recipient user for use in displaying the image of the photograph file provided by the source user and the one or more effect images overlaying the image of the photograph file provided by the source user in accordance with the associated display definition.

4. The method of claim 1 further comprising:
   receiving another request from the mobile communications device of the particular recipient user for updated personalized source user information associated with the source user;
   accessing the requested updated personalized source user information from the datastore of the aggregation server;
   transmitting the requested updated personalized source user information for display on the mobile communications device of the particular recipient user.

5. The method of claim 4 wherein the operation of receiving another request is delayed relative to a previous receiving operation by a time period enforced by a communications device of the source user.

6. The method of claim 1 further comprising:
   accessing updated personalized source user information from the datastore of the aggregation server;
   transmitting the updated personalized source user information for display on the mobile communications device of the particular recipient user.

7. The method of claim 1 further comprising:
   recording the supplemental information received from the remote web service into the datastore with the personalized source information provided by the source user; and
   transmitting the supplemental information for display with the image of the photograph file provided by the source user and the one or more effect images on the mobile communications device of the particular recipient user.

8. The method of claim 7 wherein the supplemental information from the remote web service includes at least one of weather information associated with the location identified in the user settings of the source user or time zone information associated with the location identified in the user settings of the source user.

9. A computer-readable storage medium that does not consist of a signal, said computer-readable storage medium storing computer-executable instructions implementing the method of claim 1.

10. A method of communicating source user information via a mobile communications device of a particular recipient user, the method comprising:
   receiving, through a web service of an aggregation server, a list of users for display on the mobile communications device of the particular recipient user, the list of users comprising identifiers for a source user and other users having accessible information;
   requesting, through the web service of the aggregation server, personalized source user information provided by the source user in response to selection of an identifier for the source user from the list of users, the personalized source user information including an uploaded photograph file provided by the source user, the photograph file comprising an image captured by a camera and to be accessed from the aggregation server by recipient users without active communication from the source user according to user settings specified by the source user, the user settings:
      identifying the source user by at least one of name and telephone number,
      identifying a location of the source user,
      identifying each of the recipient users by at least one of name and telephone number,
      referencing the source user information provided by the source user for receipt by the recipient users, and
      specifying an effect overlay selected by the source user for use when the photograph file is accessed by recipient users;
   receiving, at the mobile communications device of the particular recipient user from the aggregation server, the personalized source user information including the image of the photograph file provided by the source user and one or more effect images associated with the effect overlay selected by the source user for use when the photograph file is accessed by recipient users, wherein:
      each effect image has a non-zero transparency level in at least a portion of the effect image to expose a portion of the image of the photograph file for viewing when overlaying the image of the photograph file, and
      the one or more effect images were selected by the aggregation server based on supplemental information retrieved from a remote web service and associated with the location identified in the user settings of the source user; and
   displaying the personalized source information including the image of the photograph file provided by the source user and the one or more effect images overlaying the image of the photograph file provided by the source user for viewing on the mobile communications device of the particular recipient user.

11. The method of claim 10 wherein the requesting operation comprises:
   periodically polling the web service of the aggregation server to obtain updated personalized source user information provided by the source user.

12. The method of claim 10 wherein the requesting operation comprises:
   requesting the web service of the aggregation server to transmit updated personalized source user information provided by the source user when available.

13. The method of claim 10 wherein the user settings further provide a display definition specified by the source user and associated with the personalized source user information, the associated display definition specifying layout of the image of the photograph file provided by the source user and the one or more effect images overlaying the image of the photograph file provided by the source user within a display on the mobile communications device of the particular recipient user.

14. The method of claim 13 wherein the associated display definition comprises a display template, the method further comprising:
   receiving, at the mobile communications device of the recipient user from the aggregation server, the display template for use in displaying the image of the photograph file provided by the source user and the one or more effect images overlaying the image of the photograph file provided by the source user in accordance with the associated display definition.

15. The method of claim 13 further comprising:
   modifying the associated display definition in accordance with display parameters specified by the particular recipient user for display on the mobile communications device of the particular recipient user.

16. The method of claim 10 further comprising:
   receiving, at the mobile communications device of the recipient user, the supplemental information retrieved by the aggregation server from the remote web service; and
   displaying the supplemental information with image of the photograph file provided by the source user and the one or more effect images overlaying the image of the photograph file provided by the source user on the mobile communications device of the particular recipient user.

17. The method of claim 13 further comprising:
   receiving, at the mobile communications device of the recipient user, the supplemental information retrieved by the aggregation server from the remote web service; and
   displaying the supplemental information with image of the photograph file provided by the source user and the one or more effect images overlaying the image of the photograph file provided by the source user on the mobile communications device of the particular recipient user in accordance with the display definition.

18. A computer-readable storage medium that does not consist of a signal, said computer-readable storage medium storing computer-executable instructions implementing the method of claim 10.

19. The method of claim 10 further comprising:
   receiving, at the mobile communications device of the particular recipient user from the aggregation server, a sequence of foreground images associated with an animated overlay selected by the source user, wherein:
      each foreground image has a non-zero transparency level in at least a portion of the foreground image, and
      each foreground image is associated with a current condition of the location of the source user;
   storing the image of the photograph file as a background image;
   storing each foreground image in the sequence of foreground images at the mobile communications device of the particular recipient user;
   displaying the stored image of the photograph file as the background image on a display of the mobile communications device of the particular recipient user;
   displaying a first foreground image from the stored sequence of foreground images with the photograph file, such that a portion of the image of the photograph file can be seen in the portion of the first foreground image that has the non-zero transparency level;
waiting a period of time;
refreshing the image of the photograph file on the display of the mobile communications device of the particular recipient user, responsive to the waiting operation; and
displaying a second foreground image from the stored sequence of foreground images with the image of the photograph file on the display of the mobile communications device of the particular recipient user, such that a portion of the image of the photograph file can be seen in the portion of the second foreground image that has the non-zero transparency level, responsive to the refreshing operation.

20. An aggregation server for communicating source user information to a mobile communications device, the aggregation server comprising:
　a processor for executing computer-executable instructions; and
　memory storing computer-executable instructions for:
　　recording, in a datastore, personalized source user information including an uploaded photograph file provided by a source user, the photograph file comprising an image captured by a camera and to be accessed from the aggregation server by recipient users without active communication from the source user according to user settings specified by the source user, the user settings:
　　　identifying the source user by at least one of name and telephone number,
　　　identifying a location of the source user,
　　　identifying each of the recipient users by at least one of name and telephone number,
　　　referencing the source user information provided by the source user for receipt by the recipient users, and
　　　specifying an effect overlay selected by the source user for use when the photograph file is accessed by recipient users;
　　transmitting, through a web service, a list of users for display on the mobile communications device of a particular recipient user, the list of users comprising identifiers for the source user and other users having accessible personalized information;
　　receiving, through the web service, a request from the particular recipient user via the mobile communications device in response to selection of an identifier for the source user from the list of users;
　　associating the particular recipient user with the source user for providing the particular recipient with the personalized source user information provided by the source user;
　　accessing the personalized source user information including the photograph file provided by the source user from the datastore;
　　requesting supplemental information from a remote web service based on the location identified in the user settings of the source user;
　　receiving the supplemental information from the remote web service; selecting one or more effect images associated with the effect overlay selected by the source user for use when the photograph file is accessed by recipient users, wherein:
　　　each effect image has a non-zero transparency level in at least a portion of the effect image to expose a portion of the image of the photograph file for viewing when overlaying the image of the photograph file, and
　　　the one or more effect images are selected based on the supplemental information received from the remote web service; and
　　transmitting, through the web service, the personalized source user information for display of the image of the photograph file provided by the source user and for display of the one or more effect images overlaying the image of the photograph file provided by the source user for viewing on the mobile communications device of the particular recipient user.

\* \* \* \* \*